US009170820B2

(12) United States Patent
Rubin et al.

(10) Patent No.: US 9,170,820 B2
(45) Date of Patent: Oct. 27, 2015

(54) SYSCALL MECHANISM FOR PROCESSOR TO PROCESSOR CALLS

(75) Inventors: Norman Rubin, Cambridge, MA (US); Michael Mantor, Orlando, FL (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 493 days.

(21) Appl. No.: 13/327,443

(22) Filed: Dec. 15, 2011

(65) Prior Publication Data

US 2013/0155074 A1 Jun. 20, 2013

(51) Int. Cl.
| G06F 15/00 | (2006.01) |
| G06T 1/00 | (2006.01) |
| G06F 9/38 | (2006.01) |
| G06T 1/20 | (2006.01) |

(52) U.S. Cl.
CPC ............... *G06F 9/3877* (2013.01); *G06T 1/20* (2013.01)

(58) Field of Classification Search
None
See application file for complete search history.

(56) References Cited

U.S. PATENT DOCUMENTS

| 6,088,044 | A | * | 7/2000 | Kwok et al. | 345/505 |
| 6,952,217 | B1 | * | 10/2005 | Diard et al. | 345/562 |
| 7,659,898 | B2 | * | 2/2010 | Prokopenko et al. | 345/505 |
| 7,760,205 | B2 | * | 7/2010 | Washizu | 345/504 |
| 2008/0294705 | A1 | * | 11/2008 | Brauckhoff et al. | 707/205 |
| 2009/0002380 | A1 | * | 1/2009 | Langyel et al. | 345/522 |
| 2010/0045682 | A1 | * | 2/2010 | Ford et al. | 345/502 |
| 2011/0067016 | A1 | * | 3/2011 | Mizrachi et al. | 717/149 |
| 2011/0212761 | A1 | * | 9/2011 | Paulsen et al. | 463/25 |
| 2012/0069035 | A1 | * | 3/2012 | Bourd et al. | 345/541 |
| 2012/0268470 | A1 | * | 10/2012 | Duca et al. | 345/522 |

* cited by examiner

*Primary Examiner* — Stephen R Koziol
*Assistant Examiner* — Khoa Vu
(74) *Attorney, Agent, or Firm* — Volpe and Koenig, P.C.

(57) ABSTRACT

Provided is a method for processing system calls from a GPU to a CPU. The method includes a GPU storing a plurality of tasks in a memory, with each task representing a function to be performed on the CPU. The method also includes generating a CPU interrupt, and processing of the stored plurality of tasks by the CPU.

15 Claims, 4 Drawing Sheets

SYSCALL MECHANISM FOR PROCESSOR TO PROCESSOR CALLS

BACKGROUND

1. Field of the Invention

The present invention is generally directed to computing systems. More particularly, the present invention is directed to processing system calls from a graphics processing unit (GPU) to a central processing unit (CPU).

2. Background Art

The desire to use a GPU for general computation has become much more pronounced recently due to the GPU's exemplary performance per unit power and/or cost. The computational capabilities for GPUs, generally, have grown at a rate exceeding that of the corresponding CPU platforms. This growth, coupled with the explosion of the mobile computing market and its necessary supporting server/enterprise systems, has been used to provide a specified quality of desired user experience. Consequently, the combined use of CPUs and GPUs for executing workloads with data parallel content is becoming a volume technology.

However, GPUs have traditionally operated in a constrained programming environment, available only for the acceleration of graphics. These constraints arose from the fact that GPUs did not have as rich a programming ecosystem as CPUs. Their use, therefore, has been mostly limited to two-dimensional (2D) and three-dimensional (3D) graphics and a few leading edge multimedia applications, which are already accustomed to dealing with graphics and video application programming interfaces (APIs).

With the advent of multi-vendor supported OpenCL™ and DirectCompute®, standard APIs and supporting tools, the limitations of the GPUs in traditional applications has been extended beyond traditional graphics. Although OpenCL and DirectCompute are a promising start, there are many hurdles remaining to creating an environment and ecosystem that allows the combination of CPU and GPU to be used as fluidly as the CPU for most programming tasks.

Existing computing systems often include multiple processing devices. For example, some computing systems include both a CPU and a GPU on separate chips (e.g., the CPU might be located on a motherboard and the GPU might be located on a graphics card) or in a single chip package. Both of these arrangements, however, still include significant challenges associated with (i) separate memory systems, (ii) efficient scheduling, (iii) providing quality of service (QoS) guarantees between processes, (iv) programming model, and (v) compiling to multiple target instruction set architectures (ISAs)—all while minimizing power consumption.

For example, the discrete chip arrangement forces system and software architects to utilize chip to chip interfaces for each processor to access memory. While these external interfaces (e.g., chip to chip) negatively affect memory latency and power consumption for cooperating heterogeneous processors, the separate memory systems (i.e., separate address spaces) and driver managed shared memory create overhead that becomes unacceptable for fine grain offload.

In computing systems that include a CPU and a GPU, some commands cannot be executed on the GPU efficiently, and require the CPU's attention. In a conventional system, a GPU program is split into separate phases by the CPU with CPU communication occurring during phase transitions. The GPU executes identified programs during a phase. For example, the GPU executes a set of instructions in a first phase that were identified by the CPU to be executed by the GPU during the first phase. When the execution of the first phase is completed by the GPU, the CPU executes any commands required by the CPU during the phase transition, prior to the start of the next phase. After the CPU communication is completed, the GPU starts executing the commands for second phase and so on.

However, there are various problems associated with such a phased approach. The splitting of a GPU program into various phases is non-trivial and may not always be possible. There is also significant overhead associated with starting a phase which results in slowing down this approach. Further, work items that did not call the CPU still have to be launched since each phase needs to use the same work group layout, which results in additional processing to track status of the work items.

SUMMARY OF EMBODIMENTS

Accordingly, systems and methods are needed that provide a special interface to call run-time library supplied functions that are best implemented on central processing units (CPU), which are more flexible and faster than the existing systems without the need to split GPU programs into multiple phases. More specifically, what is needed are systems and methods for improved processing of GPU requests by CPU.

Although GPUs, accelerated processing units (APUs), and general purpose use of the graphics processing unit (GPGPU) are commonly used terms in this field, the expression "accelerated processing device (APD)" is considered to be a broader expression. For example, APD refers to any cooperating collection of hardware and/or software that performs those functions and computations associated with accelerating graphics processing tasks, data parallel tasks, or nested data parallel tasks in an accelerated manner with respect to resources such as conventional CPUs, conventional GPUs, and/or combinations thereof.

Embodiments of the disclosed invention, in certain circumstances, include a method, system and article of manufacture for an APD to request a CPU to process a plurality of tasks. The method for execution in a system includes a memory coupled, at least indirectly, to an APD and a CPU. The method also includes storing a plurality of tasks output from the APD in memory where each task represents a function to be performed and processed by the CPU.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the pertinent art to make and use the invention. Various embodiments of the present invention are described below with reference to the drawings, wherein like reference numerals are used to refer to like elements throughout.

The present invention will be described with reference to the accompanying drawings. Generally, the drawing in which an element first appears is typically indicated by the leftmost digit(s) in the corresponding reference number.

DETAILED DESCRIPTION

In the detailed description that follows, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "embodiments of the invention" does not require that all embodiments of the invention include the discussed feature, advantage or mode of operation. Alternate embodiments may be devised without departing from the scope of the invention, and well-known elements of the invention may not be described in detail or may be omitted so as not to obscure the relevant details of the invention. In addition, the terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1A:
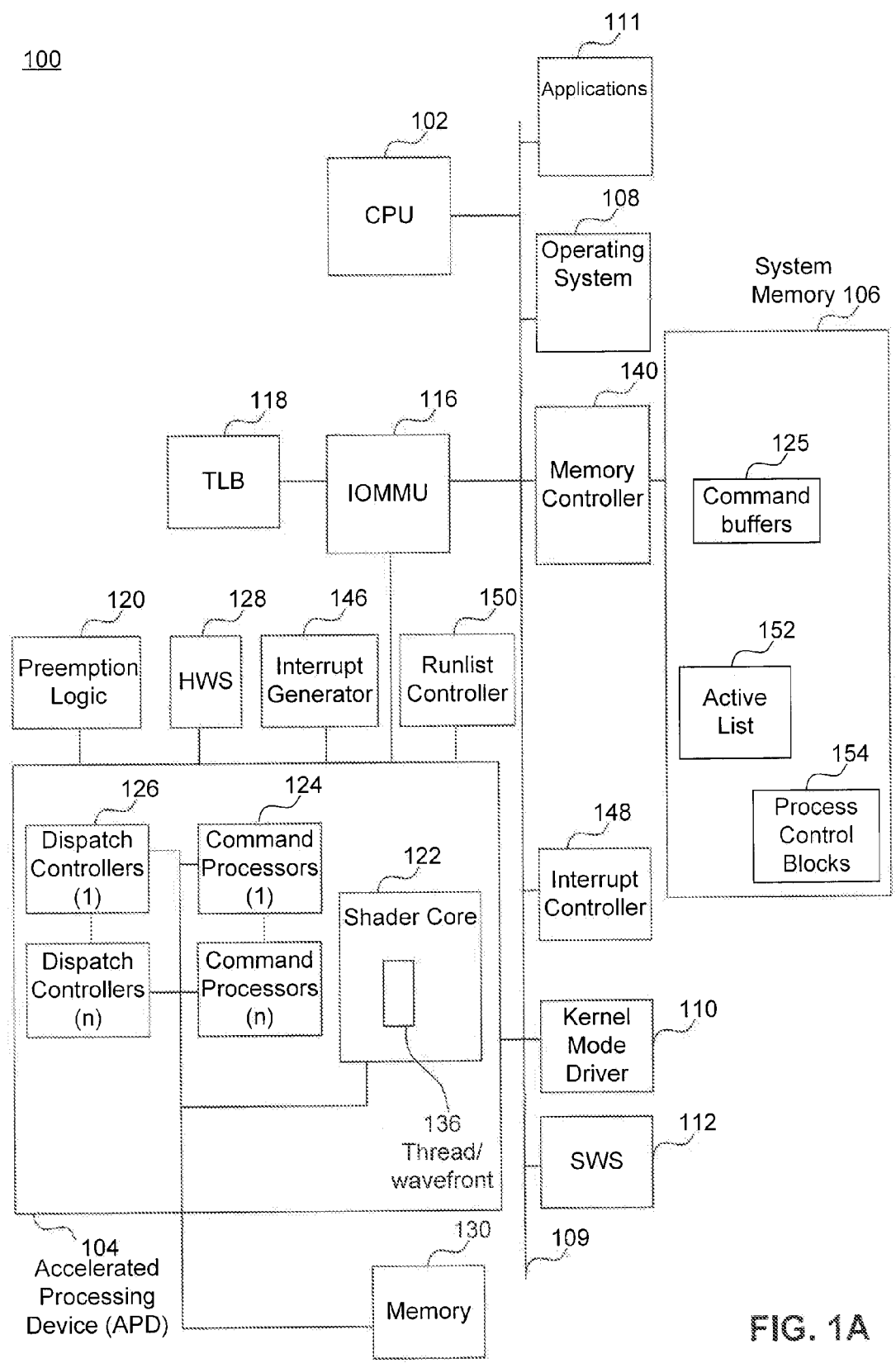
FIG. 1A is an illustrative block diagram of a processing system in accordance with embodiments of the present invention.

FIG. 1A is an exemplary illustration of a unified computing system 100 including a CPU 102 and an APD 104. CPU 102 can include one or more single or multi core CPUs. In an embodiment, system 100 is formed on a single silicon die or package, combining CPU 102 and APD 104 to provide a unified programming and execution environment. This environment enables APD 104 to be used as fluidly as the CPU 102 for some programming tasks. However, it is not an absolute requirement of this invention that CPU 102 and APD 104 be formed on a single silicon die. In some embodiments, it is possible for various components, e.g., CPU 102 and APD 104, to be formed separately and mounted on the same or different substrates.

In one example, system 100 also includes system memory 106, an operating system 108, and a communication infrastructure 109. Operating system 108 and communication infrastructure 109 are discussed in greater detail below.

System 100 also includes a kernel mode driver (KMD) 110, a software scheduler (SWS) 112, and a memory management unit, such as input/output memory management unit (IOMMU) 116. Components of system 100 can be implemented as hardware, firmware, software, or any combination thereof. A person of ordinary skill in the art will appreciate that system 100 may include one or more software, hardware, and firmware components in addition to, or different from, that shown in the embodiment shown in FIG. 1A.

In one example, a driver, such as KMD 110, typically communicates with a device through a computer bus or communications subsystem to which the hardware connects. When a calling program invokes a routine in the driver, the driver issues commands to the device. Once the device sends data back to the driver, the driver may invoke routines in the original calling program. In one example, drivers are hardware-dependent and operating-system-specific. They usually provide the interrupt handling required for any necessary asynchronous time-dependent hardware interface. Device drivers, particularly on modern Windows platforms, can run in kernel-mode (Ring 0) or user-mode (Ring 3).

A benefit of running a driver in user mode is improved stability, since a poorly written user mode device driver cannot crash the system by overwriting kernel memory. On the other hand, user/kernel-mode transitions usually impose a considerable performance overhead, thereby prohibiting user mode-drivers for low latency and high throughput requirements. Kernel space can be accessed by user modules only through the use of system calls. End user programs like the UNIX shell or other GUI based applications are part of the user space. These applications interact with hardware through kernel supported functions.

CPU 102 can include (not shown) one or more control processors, field programmable gate array (FPGA), application specific integrated circuit (ASIC), or digital signal processor (DSP). CPU 102, for example, executes the control logic, including the operating system 108, KMD 110, SWS 112, and applications 111, that control the operation of computing system 100. In this illustrative embodiment, CPU 102, according to one embodiment, initiates and controls the execution of applications 111 by, for example, distributing the processing associated with that application across CPU 102 and other processing resources, such as APD 104.

APD 104, among other things, executes commands and programs for selected functions, such as graphics operations and other operations that are particularly suited for parallel processing. In general, APD 104 can frequently be used for executing graphics pipeline operations, such as pixel operations, geometric computations, and rendering an image to a display. In various embodiments of the present invention, APD 104 can also execute compute processing operations, based on commands or instructions received from CPU 102.

For example, a command can be considered a special instruction that is not defined in a particular Instruction Set Architecture (ISA) that is usually accomplished by a set of instructions from a different ISA or a unique piece of hardware. A command may be executed by a special processor such as a dispatch processor, command processor, or network controller. On the other hand, instructions can be considered a single operation of a processor within a computer architecture. In one example, when using two sets of ISAs, some instructions are used to execute x86 programs and some instructions are used to execute kernels on APD/GPU compute units.

In an illustrative embodiment, CPU 102 transmits selected commands to APD 104. These selected commands can include graphics commands and other commands amenable to parallel execution. These selected commands, that can also include compute processing commands, can be executed substantially independently from CPU 102 by APD 104.

APD 104 can include its own compute units (not shown), such as, but not limited to, one or more single instruction multiple data (SIMD) processing cores. As referred to herein, a SIMD is a math pipeline, or programming model, where a kernel is executed concurrently on multiple processing elements each with its own data and a shared program counter. All processing elements execute a strictly identical set of instructions.

In one example, each APD 104 compute unit can include one or more scalar and/or vector floating-point units and/or arithmetic and logic units (ALUs). The APD compute unit can also include special purpose processing units (not shown), such as inverse-square root units and sine/cosine units. In one example, the APD compute units are referred to herein collectively as shader core 122.

Having one or more SIMDs, in general, makes APD 104 ideally suited for execution of data-parallel tasks that are common in graphics processing.

Some graphics pipeline operations, such as pixel processing, and other parallel computation operations, can require that the same command stream or compute kernel be performed on streams or collections of input data elements. Respective instantiations of the same compute kernel can be executed concurrently on multiple compute units in shader core 122 in order to process such data elements in parallel. As referred to herein, for example, a compute kernel is a function containing instructions declared in a program and executed on an APD/GPU compute unit. This function is also referred to as a kernel, a shader, a shader program, or a program.

In one illustrative embodiment, each compute unit (e.g., SIMD processing core) can execute a respective instantiation of a particular work item to process incoming data. A work item is one of a collection of parallel executions of a kernel invoked on a device by a command. A work item can be executed by one or more processing elements as part of a work-group executing on a compute unit.

A work item is distinguished from other executions within the collection by its global ID and local ID. In one example, a subset of work items in a workgroup that execute simultaneously together on a single SIMD engine can be referred to as a wavefront 136. The width of a wavefront is a characteristic of the hardware SIMD engine. As referred to herein, a workgroup is a collection of related work items that execute on a single compute unit. The work items in the workgroup execute the same kernel and share local memory and work group barriers.

All wavefronts in a workgroup are processed on the same SIMD engine. Instructions across a wavefront are issued one at a time, and when all work items follow the same control flow, each work item executes the same program. An execution mask and work item prediction are used to enable divergent control flow within a wavefront, where each individual work item can actually take a unique code path through the kernel. Partially populated wavefronts can be processed when a full set of work items is not available at wavefront start time. Wavefronts can also be referred to as warps, vectors, or threads.

Commands can be issued one at a time for the wavefront. When all work items follow the same control flow, each work item can execute the same program. In one example, an execution mask and work item prediction are used to enable divergent control flow where each individual work item can actually take a unique code path through a kernel driver. Partial wavefronts can be processed when a full set of work items is not available at start time. For example, shader core 122 can simultaneously execute a predetermined number of wavefronts 136, each wavefront 136 comprising a predetermined number of work items.

Within system 100, APD 104 includes its own memory, such as graphics memory 130. Graphics memory 130 provides local memory for use during computations in APD 104. Individual compute units (not shown) within shader core 122 can have their own local data store (not shown). In an embodiment, APD 104 includes access to local graphics memory 130, as well as access to system memory 106. In another embodiment, APD 104 can include access to dynamic random access memory (DRAM) or other such memories (not shown) attached directly to the APD 104 and separately from system memory 106.

In the example shown, APD 104 also includes one or (n) number of command processors (CPs) 124. CP 124 controls the processing within APD 104. CP 124 also retrieves commands to be executed from command buffers 125 in system memory 106 and coordinates the execution of those commands on APD 104.

In an example, CPU 102 inputs commands based on applications 111 into appropriate command buffers 125. As referred to herein, an application is the combination of the program parts that will execute on the compute units within a CPU and APD.

A plurality of command buffers 125 can be maintained with each process scheduled for execution on APD 104.

CP 124 can be implemented in hardware, firmware, or software, or a combination thereof. In one embodiment, CP 124 is implemented as a reduced instruction set computer (RISC) engine with microcode for implementing logic including scheduling logic.

In an embodiment, APD 104 also includes one or (n) number of dispatch controllers (DCs) 126. In the present application, the term dispatch refers to a command executed by a dispatch controller that uses the context state to initiate the start of the execution of a kernel for a set of workgroups on a set of compute units. DC 126 includes logic to initiate workgroups in shader core 122. In some embodiments, DC 126 can be implemented as part of CP 124.

System 100 also includes a hardware scheduler (HWS) 128 for selecting a process from a runlist 150 for execution on APD 104. HWS 128 can select processes from runlist 150 using round robin methodology, priority level, or based on other scheduling policies. The priority level, for example, can be dynamically determined. HWS 128 can also include functionality to manage runlist 150, for example, by adding new processes and by deleting existing processes from runlist 150. The runlist management logic of HWS 128 is sometimes referred to as a runlist controller (RLC).

In various embodiments of the present invention, when HWS 128 initiates the execution of a process from RLC 150, CP 124 begins retrieving and executing commands from the corresponding command buffer 125. In some instances, CP 124 can generate one or more commands to be executed within APD 104, which correspond with commands received from CPU 102. In one embodiment, CP 124, together with other components, implements a prioritizing and scheduling of commands on APD 104 in a manner that improves or maximizes the utilization of the resources of APD 104 and/or system 100.

APD 104 can have access to, or may include, an interrupt generator 146. Interrupt generator 146 can be configured by APD 104 to interrupt operating system 108 when interrupt events, such as page faults, are encountered by APD 104. For example, APD 104 can rely on interrupt generation logic within IOMMU 116 to create the page fault interrupts noted above.

APD 104 can also include preemption logic 120 for preempting a process currently running within shader core 122. APD 104 can also include context switch logic, for example, includes functionality to stop the process and save its current state (e.g., shader core 122 state, and CP 124 state).

As referred to herein, the term state can include an initial state, an intermediate state, and a final state. An initial state is a starting point for a machine to process an input data set according to a program in order to create an output set of data. There is an intermediate state, for example, that needs to be stored at several points to enable the processing to make forward progress. This intermediate state is sometimes stored to allow a continuation of execution at a later time when interrupted by some other process. There is also final state that can be recorded as part of the output data set Preemption and context switch logic 120 can also include logic to context switch another process into APD 104. The functionality to context switch another process into running on APD 104 may include instantiating the process, for example, through CP 124 and DC 126 to run on APD 104, restoring any previously saved state for that process, and starting its execution.

System memory 106 can include non-persistent memory such as DRAM (not shown). System memory 106 can store data, e.g., processing logic instructions, constant values, and variable values, during execution of portions of applications or other processing logic. For example, in one embodiment, parts of control logic to perform one or more operations on CPU 102 can reside within system memory 106 during execution of the respective portions of the operation by CPU 102. The term "processing logic" or "logic," as used herein, refers to control flow commands, commands for performing computations, and commands for associated access to resources.

During execution, respective applications, operating system functions, processing logic commands, and system software can reside in system memory 106. Control logic commands fundamental to operating system 108 will generally reside in system memory 106 during execution. Other software commands, including, for example, KMD 110 and software scheduler 112 can also reside in system memory 106 during execution of system 100.

In this example, system memory 106 includes command buffers 125 that are used by CPU 102 to send commands to APD 104. System memory 106 also contains process lists and process information (e.g., active list 152 and process control blocks 154). These lists, as well as the information, are used by scheduling software executing on CPU 102 to communicate scheduling information to APD 104 and/or related scheduling hardware. Access to system memory 106 can be managed by a memory controller 140, which is coupled to system memory 106. For example, requests from CPU 102, or from other devices, for reading from or for writing to system memory 106 are managed by the memory controller 140.

Referring back to other aspects of system 100, IOMMU 116 is a multi-context memory management unit.

As used herein, context (sometimes referred to as process) can be considered the environment within which the kernels execute and the domain in which synchronization and memory management is defined. The context includes a set of devices, the memory accessible to those devices, the corresponding memory properties and one or more command-queues used to schedule execution of a kernel(s) or operations on memory objects. On the other hand, process can be considered the execution of a program for an application will create a process that runs on a computer. The operating system can create data records and virtual memory address spaces for the program to execute. The memory and current state of the execution of the program can be called a process. The operating system will schedule tasks for the process to operate on the memory from an initial to final state.

Referring back to the example shown in FIG. 1A, IOMMU 116 includes logic to perform virtual to physical address translation for memory page access for devices, including APD 104. IOMMU 116 may also include logic to generate interrupts, for example, when a page access by a device such as APD 104 results in a page fault. IOMMU 116 may also include, or have access to, a translation lookaside buffer (TLB) 118. TLB 118, as an example, can be implemented in a content addressable memory (CAM) to accelerate translation of logical (i.e., virtual) memory addresses to physical memory addresses for requests made by APD 104 for data in system memory 106.

In the example shown, communication infrastructure 109 interconnects the components of system 100 as needed. Communication infrastructure 109 can include (not shown) one or more of a peripheral component interconnect (PCI) bus, extended PCI (PCI-E) bus, advanced microcontroller bus architecture (AMBA) bus, accelerated graphics port (AGP), or such communication infrastructure. Communications infrastructure 109 can also include an Ethernet, or similar network, or any suitable physical communications infrastructure that satisfies an application's data transfer rate requirements. Communication infrastructure 109 includes the functionality to interconnect components including components of computing system 100.

In this example, operating system 108 includes functionality to manage the hardware components of system 100 and to provide common services. In various embodiments, operating system 108 can execute on CPU 102 and provide common services. These common services can include, for example, scheduling applications for execution within CPU 102, fault management, interrupt service, as well as processing the input and output of other applications.

In some embodiments, based on interrupts generated by an interrupt controller, such as interrupt controller 148, operating system 108 invokes an appropriate interrupt handling routine. For example, upon detecting a page fault interrupt, operating system 108 may invoke an interrupt handler to initiate loading of the relevant page into system memory 106 and to update corresponding page tables.

Operating system 108 may also include functionality to protect system 100 by ensuring that access to hardware components is mediated through operating system managed kernel functionality. In effect, operating system 108 ensures that applications, such as applications 111, run on CPU 102 in user space. Operating system 108 also ensures that applications 111 invoke kernel functionality provided by the operating system to access hardware and/or input/output functionality.

By way of example, applications 111 include various programs or commands to perform user computations that are also executed on CPU 102. The unification concepts can allow CPU 102 to seamlessly send selected commands for processing on the APD 104. Under this unified APD/CPU framework, input/output requests from applications 111 will be processed through corresponding operating system functionality.

In one example, KMD 110 implements an application program interface (API) through which CPU 102, or applications executing on CPU 102 or other logic, can invoke APD 104 functionality. For example, KMD 110 can enqueue commands from CPU 102 to command buffers 125 from which APD 104 will subsequently retrieve the commands. Additionally, KMD 110 can, together with SWS 112, perform scheduling of processes to be executed on APD 104. SWS 112, for example, can include logic to maintain a prioritized list of processes to be executed on the APD.

In other embodiments of the present invention, applications executing on CPU 102 can entirely bypass KMD 110 when enqueuing commands.

In an embodiment, SWS 112 maintains an active list 152 in system memory 106 of processes to be executed on APD 104. SWS 112 also selects a subset of the processes in active list 152 to be managed by HWS 128 in the hardware. Information relevant for running each process on APD 104 is communicated from CPU 102 to APD 104 through process control blocks (PCB) 154.

A person of skill in the art will understand, upon reading this description, that computing system 100 can include more or fewer components than shown in FIG. 1A. For example, computing system 100 can include one or more input interfaces, non-volatile storage, one or more output interfaces, network interfaces, and one or more displays or display interfaces.

Figure 1B:
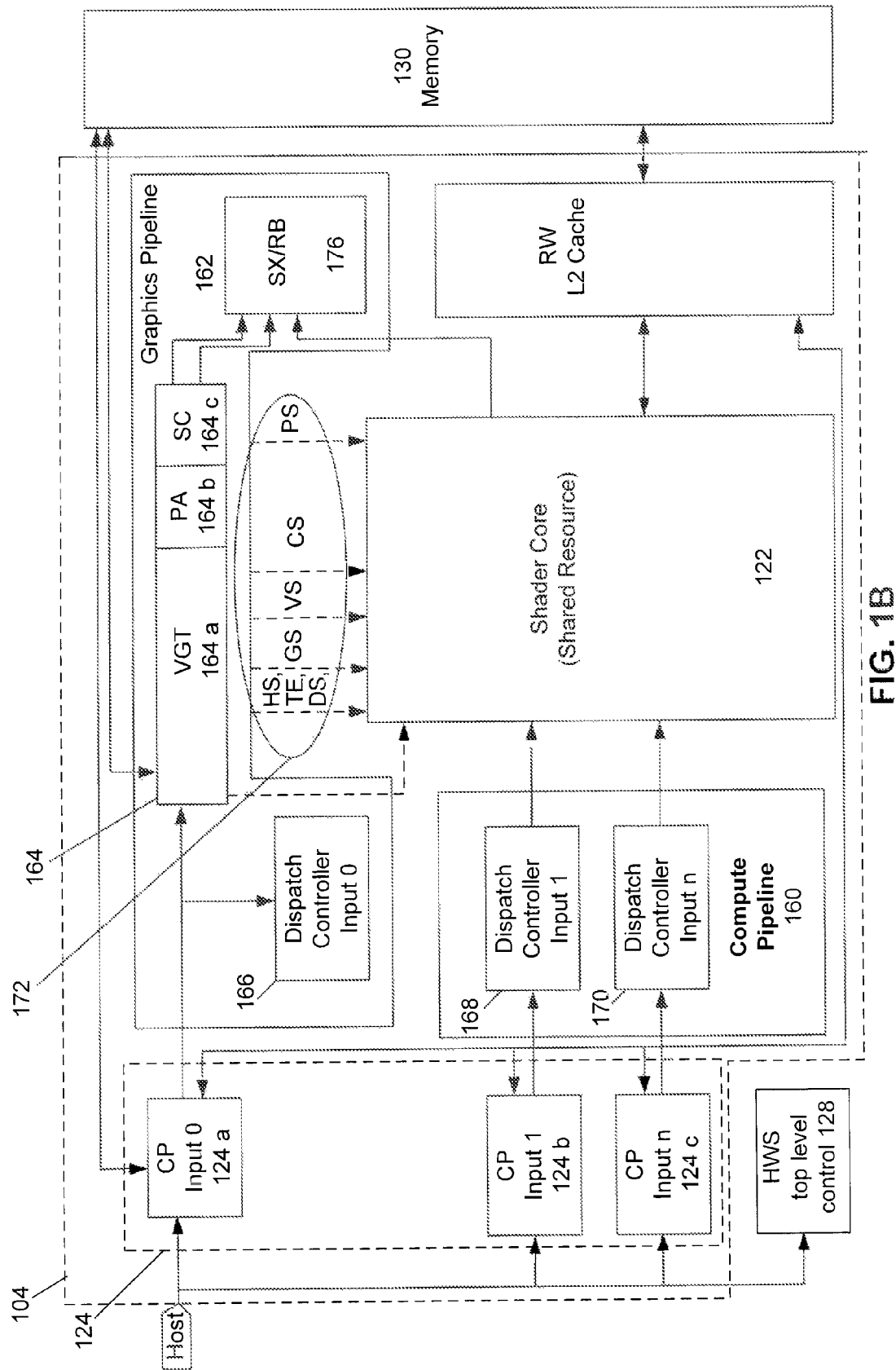
FIG. 1B is an illustrative block diagram illustration of an APD illustrated in FIG. 1A, according to an embodiment.

FIG. 1B is an embodiment showing a more detailed illustration of APD 104 shown in FIG. 1A. In FIG. 1B, CP 124 can include CP pipelines 124a, 124b, and 124c. CP 124 can be configured to process the command lists that are provided as inputs from command buffers 125, shown in FIG. 1A. In the exemplary operation of FIG. 1B, CP input 0 (124a) is responsible for driving commands into a graphics pipeline 162. CP inputs 1 and 2 (124b and 124c) forward commands to a compute pipeline 160. Also provided is a controller mechanism 166 for controlling operation of HWS 128.

In FIG. 1B, graphics pipeline 162 can include a set of blocks, referred to herein as ordered pipeline 164. As an example, ordered pipeline 164 includes a vertex group translator (VGT) 164a, a primitive assembler (PA) 164b, a scan converter (SC) 164c, and a shader-export, render-back unit (SX/RB) 176. Each block within ordered pipeline 164 may represent a different stage of graphics processing within graphics pipeline 162. Ordered pipeline 164 can be a fixed function hardware pipeline. Although other implementations that would be within the spirit and scope of the present invention can be used.

Although only a small amount of data may be provided as an input to graphics pipeline 162, this data will be amplified by the time it is provided as an output from graphics pipeline 162. Graphics pipeline 162 also includes DC 166 for counting through ranges within work item groups received from CP pipeline 124a. Compute work submitted through DC 166 is semi-synchronous with graphics pipeline 162.

Compute pipeline 160 includes shader DCs 168 and 170. Each of the DCs is configured to count through compute ranges within work groups received from CP pipelines 124b and 124c.

The DCs 166, 168, and 170, illustrated in FIG. 1B, receive the input ranges, break the ranges down into workgroups, and then forward the workgroups to shader core 122.

Since graphics pipeline 162 is generally a fixed function pipeline, it is difficult to save and restore its state, and as a result, the graphics pipeline 162 is difficult to context switch. Therefore, in most cases context switching, as discussed herein, does not pertain to context switching among graphics processes. The exception is for graphics work in shader core 122, which can be context switched.

Shader core 122 can be shared by graphics pipeline 162 and compute pipeline 160. Shader core 122 can be a general processor configured to run wavefronts.

In one example, all work within compute pipeline 160 is processed within shader core 122. Shader core 122 runs programmable software code and includes various forms of data, such as state data. Compute pipeline 160, however, does not send work to graphics pipeline 162 for processing. After processing of work within graphics pipeline 162 has been completed, the completed work is processed through a render back unit 176, which does depth and color calculations, and then writes its final results to graphics memory 130.

It would be apparent to one of skill in the art that the present invention, as described below, can be implemented in many different embodiments of software, hardware, firmware, and/or the entities illustrated in the figures. Any actual software code with the specialized control of hardware to implement the present invention is not limiting of the present invention. Thus, the operational behavior of the present invention will be described with the understanding that modifications and variations of the embodiments are possible, given the level of detail presented herein.

Additionally, and as will be apparent to one of skill in the art, the simulation, synthesis and/or manufacture of the various embodiments of this invention may be accomplished, in part, through the use of computer-readable code (as noted above), including general programming languages (such as C or C++), hardware description languages (HDL) including Verilog HDL, VHDL, Altera HDL (AHDL) and so on, or other available programming and/or schematic capture tools (such as circuit capture tools). This computer-readable code can be disposed in any known computer usable medium including semiconductor, magnetic disk, optical disk (such as CD-ROM, DVD-ROM) and as a computer data signal embodied in a computer-usable (e.g., readable) transmission medium (such as a carrier wave or any other medium including digital, optical, or analog-based medium).

As such, the code can be transmitted over communication networks including the Internet and intranets. It is understood that the functions accomplished and/or structure provided by the systems and techniques described above can be represented in a core (such as an APD core and/or a CPU core) that is embodied in program code and may be transformed to hardware as part of the production of integrated circuits.

Embodiments of the present invention allow programmers to write applications that seamlessly transition processing of data between CPUs and APDs, benefiting from the best attributes each has to offer. A unified single programming platform can provide a strong foundation for development in languages, frameworks, and applications that exploit parallelism.

The embodiments of the present invention allow programmers to write applications that seamlessly transition processing of data between CPUs and APDs, benefiting from the best attributes each has to offer. A unified single programming platform can provide a strong foundation for development in languages, frameworks, and applications that exploit parallelism.

Figure 2:
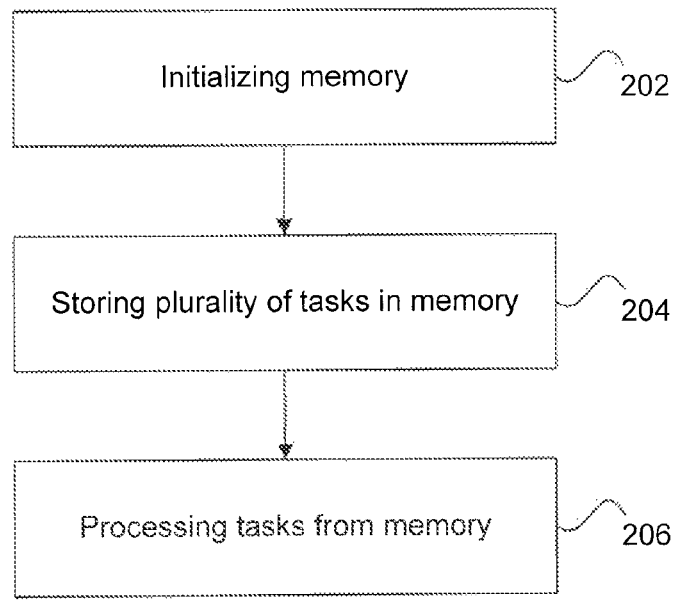
FIG. 2 is an illustrative flow chart of syscall mechanism for GPU to CPU calls, according to an embodiment.

FIG. 2 is an illustrative flow chart of syscall mechanism for GPU to CPU calls, according to an embodiment. It shows APD 104 requesting CPU 102 to process tasks stored in system memory 106.

At step 202, system memory 106 used for implementation of a number of mailboxes is initialized. The mailboxes are used for communication between CPU 102 and APD 104. Both APD 104 and CPU 102 can access system memory 106. The number of mailboxes may be much less than the number of active work items.

At step 204, APD 104 stores a plurality of tasks in system memory 106. Each task represents a command (system call or syscall) to CPU 102 to execute a function or an operation identified by the command. These tasks are typically functions that are best implemented on CPUs as APDs do not have as rich a programming ecosystem as CPUs. Each implementation provides a list of common functions such as vprintf, malloc, free, fileio, and so forth. These functions have been presented by way of example only, and not as a limitation.

At step 206, CPU 102 processes tasks stored in the mailboxes in system memory 106 by executing the requested operation by APD 104. After CPU 102 processes the tasks, CPU 102 writes the result into a mailbox, and changes the state of the mail box specific to the executed task and sends a message back to APD 104.

Figure 3:
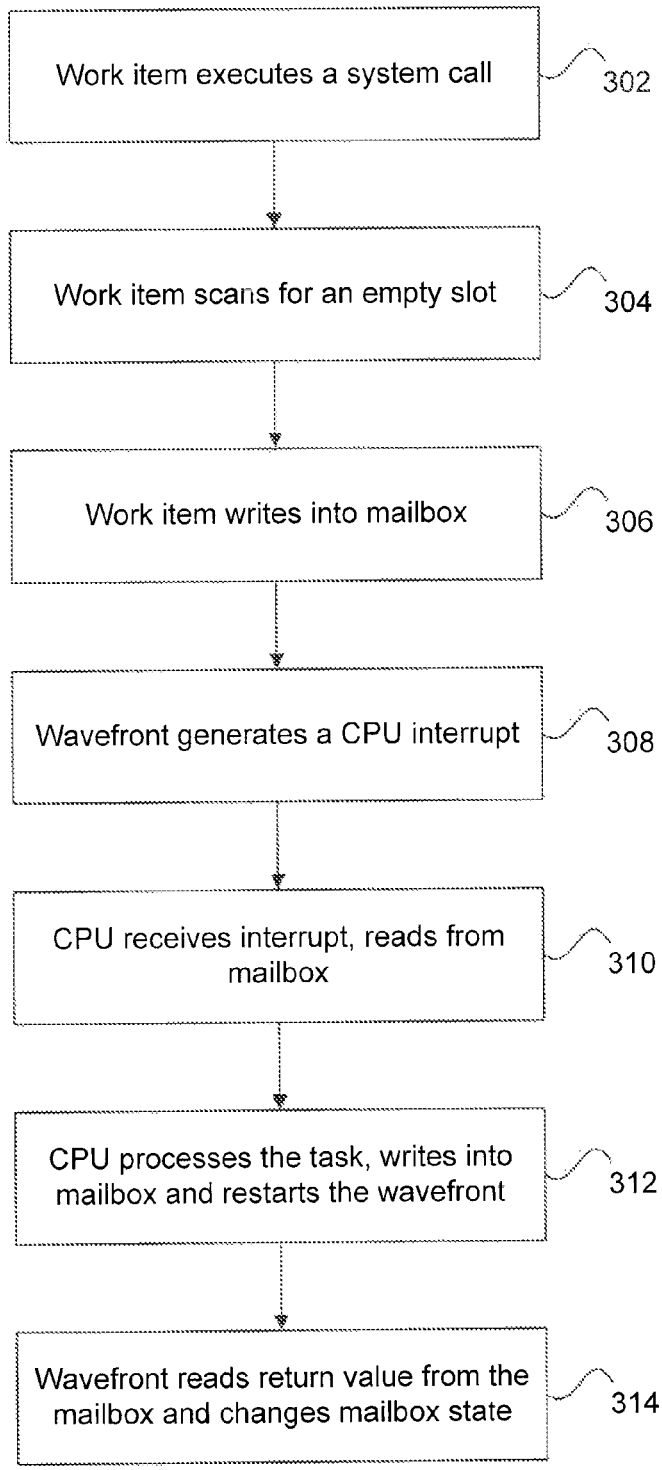
FIG. 3 is an illustrative flow chart of a GPU using mailboxes to communicate syscall requests to a CPU, according to an embodiment.

FIG. 3 is an illustrative flow chart 300 using mailboxes to communicate requests from a APD to a CPU.

At step 302, a work item executes a syscall operation. A syscall operation is made when the GPU requires CPU to execute a function or a command as described above. The syscall operation is used to call run-time library-supplied functions. These are typically functions that are best implemented on latency compute units. Each implementation and run-time library provides a list of such functions such as vprintf, malloc, free, fileio and others as described above.

In a non-limiting example, an exemplary system command (syscall) format may be described as "syscall destination-register, N, s0, s1, s2," where 'N' is a fixed integer that selects the operation, and s0, s1 and s2 are registers used to provide inputs. The destination-register can be a 64-bit register.

In an embodiment, the syscall operation transfers an operation number and up to 3×32 bits of data from GPU to CPU. Developers that want to pass more data to a specific syscall operation can use buffers in global memory. A typical implementation defines a small number of mailboxes, internally in software. The number of mailboxes may be much less than the maximum number of active work items. Each mailbox also has an associated state such as FREE, FILLING, ACTIVE and RETURNING, which identifies the state of a mailbox at that instance.

At step 304, the work item that executed the syscall operation uses a software loop to scan for mailboxes looking for an empty slot—a mailbox whose state is marked FREE. If there are no empty slots the work item waits and tries again. The work item continues to look for an empty slot until one is available. Additionally, the work items could also be prioritized for finding an empty box earlier. This functionality is optional, and is not required for the current implementation to work.

At step 306, once a work item finds an empty slot, the work item changes the state of the mailbox from FREE to FILLING and then copies its ID, N, and the three registers into the mailbox. The work item then changes the state of the mailbox from FILLING to ACTIVE.

At step 308, a wavefront containing the work item generates a CPU interrupt by executing a new hardware instruction (GPU sends interrupt to CPU) and the wavefront goes to sleep. The wavefront goes to sleep by executing another new hardware instruction (GPU sleep). The interrupt to the CPU is a way to make the CPU aware of a syscall made by a work item.

At step 310, the CPU receives the interrupt generated in step 308, and the software on the CPU scans the mailboxes looking for a mailbox marked ACTIVE. When the CPU finds a mailbox marked ACTIVE, the CPU reads the data stored in the mailbox.

At step 312, the CPU processes the syscall based on the data read from the mailbox, and writes the result of its processing into the mailbox. The CPU also changes the state of the mailbox to RETURNING, and restarts the wavefront by executing a new hardware instruction (CPU sends restart to GPU work item) with the wavefront id in the mailbox.

At step 314, the wavefront wakes up from its sleep (step 308). It reads the return value from the mailbox and changes the state of the mailbox back to FREE so other work items could use the mailbox for making syscalls to the CPU.

The techniques discussed above eliminate the need for a CPU to split GPU programs into multiple phases. Instead, the GPU can make a request to the CPU whenever it requires CPU's attention through the "syscall" mechanism disclosed above. The syscall mechanism is implemented using a special interface for calling run-time library supplied functions as explained in detail above, and the GPU continues processing. As a result, the CPU can execute its programs much faster and with less overhead. Thus, the mechanism disclosed above eliminates the need for a CPU to split a GPU program into multiple phases.

Various aspects of the present invention can be implemented by software, firmware, hardware, or a combination thereof. For example, the methods illustrated by flowcharts 200 of FIGS. 2 and 300 of FIG. 3 can be implemented in unified computing system 100 of FIG. 1A. Various embodiments of the invention are described in terms of this example unified computing system 100. It would be apparent to a person skilled in the relevant art how to implement the invention using other computer systems and/or computer architectures.

In this document, the terms "computer program medium" and "computer-usable medium" are used to generally refer to media such as a removable storage unit or a hard disk drive. Computer program medium and computer-usable medium can also refer to memories, such as system memory 106 and graphics memory 130, which can be memory semiconductors (e.g., DRAMs, etc.). These computer program products are means for providing software to unified computing system 100.

The invention is also directed to computer program products comprising software stored on any computer-usable medium. Such software, when executed in one or more data processing devices, causes a data processing device(s) to operate as described herein or, as noted above, allows for the synthesis and/or manufacture of computing devices (e.g., ASICs, or processors) to perform embodiments of the present invention described herein. Embodiments of the invention employ any computer-usable or -readable medium, known now or in the future. Examples of computer-usable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage devices, etc.), and communication mediums wired and wireless communications networks, local area networks, wide area networks, intranets, etc.).

While various embodiments of the present invention have been described above, it should be understood that they have been presented by way of example only, and not limitation. It will be understood by those skilled in the relevant art that various changes in form and details can be made therein without departing from the spirit and scope of the invention as defined in the appended claims. It should be understood that the invention is not limited to these examples. The invention is applicable to any elements operating as described herein. Accordingly, the breadth and scope of the present invention should not be limited by any of the above-described exemplary embodiments, but should be defined only in accordance with the following claims and their equivalents.

What is claimed is:

1. A method comprising:
   determining, by an accelerated processing device (APD), that one or more tasks is to be implemented by a central processing unit (CPU), each task representing a function or operation to be performed;

storing, by the APD, the one or more determined tasks in one of a plurality of memory mailboxes, wherein the memory mailboxes have an associated state, the associated state including a free, filling, active and returning state; and wherein the storing comprises:

using a work item to scan the plurality of mailboxes for a mailbox in a free state, wherein the work item has an associated identifier;

selecting a mailbox in a free state;

storing the work item identifier, task and associated registers in the selected mailbox; and changing the state of the selected mailbox to an active state;

generating, by the APD, a CPU interrupt to notify the CPU that the stored one or more tasks is to be processed; and processing, by the CPU, the stored tasks.

2. The method of claim 1, wherein processing, by the CPU, the stored tasks comprises:

scanning the mailboxes, using the CPU, for mailboxes in an active state;

executing the task stored in the mailboxes in the active state; and changing the state of the mailboxes to the returning state.

3. A method comprising:

receiving, in a central processing unit (CPU), an interrupt from an accelerated processing device (APD);

processing, based on the interrupt, by the CPU, a plurality of tasks output from the APD and stored in the memory in one of a plurality of memory mailboxes, each task representing a function to be, wherein the plurality of memory mailboxes have an associated state;

receiving, from a work item, a system call operation, the system call operation indicating that the APD requests the CPU to execute a task of the plurality of tasks;

scanning, using the work item, the mailboxes to locate a mailbox in the free state;

changing a state of the mailbox from free to active;

using a wavefront containing the work item to notify the CPU of the system call operation;

using the CPU to read data from the mailbox marked active; and processing, by the CPU, the system call operation based on the data read from the active mailbox.

4. The method of claim 3, further comprising:

pausing, by the APD, the wavefront;

writing the results of the processing by the CPU in the memory mailboxes;

changing, by the CPU, the state of the memory mailboxes to the returning state; and restarting, by the CPU, the wavefront.

5. A system, comprising:

a memory;

an accelerated processing device (APD); and a central processing unit (CPU);

wherein the APD is configured to determine if one or more tasks is to be implemented on a central processing unit (CPU), each task representing a function or operation to be performed;

wherein the memory is configured to store the one or more tasks in one of a plurality of mailboxes having an associated state, the associated state including a free, filling, active and returning state; and wherein the storing comprises:

using a work item to scan the plurality of mailboxes for a mailbox in a free state, wherein the work item has an associated identifier;

selecting a mailbox in a free state;

storing the work item identifier, task and associated registers in the selected mailbox; and changing the state of the selected mailbox to an active state;

wherein the APD is further configured to generate a CPU interrupt; and wherein the CPU is configured to perform the plurality of tasks upon receipt of the CPU interrupt.

6. A system, comprising:

an accelerated processing device (APD) configured to:

determine that one or more tasks is to be implemented by a central processing unit (CPU), each task representing a function or operation to be performed, store the one or more determined tasks in a memory, and send a CPU interrupt using a wavefront to notify the CPU that one or more tasks is to be processed;

the memory is configured to store the tasks received from the APD in one of a plurality of mailboxes having an associated state, the associated state including a free, filling, active and returning state; and wherein the storing comprises:

using a work item to scan the plurality of mailboxes for a mailbox in a free state, wherein the work item has an associated identifier;

selecting a mailbox in a free state;

storing the work item identifier, task and associated registers in the selected mailbox; and changing the state of the selected mailbox to an active state;

the central processing unit (CPU) is configured to receive an interrupt and process the stored plurality of tasks from the memory based on the interrupt.

7. The system of claim 6, wherein the plurality of mailboxes have an associated state, wherein the states include a free, filling, active and returning state.

8. An article of manufacture including a non-transitory computer-readable medium having instructions stored thereon that, when executed by a computing device, cause the computing device to perform operations comprising:

storing a plurality of tasks output from an accelerated processing device (APD), in a one of plurality of memory mailboxes, each task representing a function or operations to be performed, wherein the plurality of memory mailboxes have an associated state;

generating a work item, wherein the work item includes a system call operation, the system call operating indicating that the APD requests a central processing unit (CPU) to execute a task of the plurality of tasks;

scanning, using the work item, the plurality of mailboxes to locate a mailbox in the free state;

changing a state of the mailbox from free to active;

using a wavefront containing the work item to notify the CPU of the system call operation;

using the CPU to read data from the mailbox marked active; and processing, by the CPU, the system call operation based on the data read from the active mailbox.

9. A non-transitory computer-readable medium having instructions recorded thereon that, when executed by a computing device, cause the computing device to perform operations comprising:

determining that one or more tasks scheduled to be executed by an accelerated processing device (APD) is to be implemented by a central processing unit (CPU), each task representing a function or operation to be performed;

instructions to store the one or more tasks in one of a plurality of memory mailboxes, wherein the plurality of memory mailboxes each have an associated state, the associated state including a free, filling, active and returning state; and wherein the storing comprises:
- using a work item to scan the plurality of mailboxes for a mailbox in a free state, wherein the work item has an associated identifier;
- selecting a mailbox in a free state;
- storing the work item identifier, task and associated registers in the selected mailbox; and
- changing the state of the selected mailbox to an active state;

generating a CPU interrupt, the CPU interrupt notifying the CPU that the APD has requested tasks to be performed; and reading from the memory, by the CPU, the stored plurality of tasks.

10. The method of claim 3, further comprising:
reading, by the GPU, a return value from the mailbox; and changing the state of the mailbox back to free.

11. The method of claim 3, further comprising:
reading a return value from the mailbox to indicate to other work items that the mailbox is free to make additional system operation calls to the CPU.

12. The method of claim 3, further comprising prioritizing work items for locating an empty slot box.

13. The system of claim 5, wherein the APD is further configured to generate the CPU interrupt using a wavefront.

14. The system of claim 13, wherein the wavefront is configured to execute a hardware instruction to generate the CPU interrupt.

15. The system of claim 14, wherein the wavefront is further configured to read results from the processed tasks and notify the APD that the CPU is available to perform additional tasks.

* * * * *